FIG. I

ZVONIMIR JUAN ZEC
*INVENTOR.*

United States Patent Office 3,428,547
Patented Feb. 18, 1969

3,428,547
ANTISERUM APPLICATOR USED IN
IMMUNOELECTROPHORESIS
Zvonimir Juan Zec, Palo Alto, Calif., assignor to Beckman Instruments, Inc., a corporation of California
Filed July 2, 1965, Ser. No. 469,214
U.S. Cl. 204—299          8 Claims
Int. Cl. B01k 5/00

ABSTRACT OF THE DISCLOSURE

Semiautomatic apparatus for applying a quantity of antiserum to a filter paper strip placed on an electrophoresis support membrane comprising a cam-operated syringe holding a quantity of antiserum, a tube for delivering antiserum from the syringe to the paper strip and a two-way valve positionable for filling the syringe and dispensing fluid from the syringe.

This invention relates generally to immunoelectrophoresis and more particularly to immunoelectrophoresis in which it is necessary to apply antiserum to paper strips placed on a cellulose acetate membrane utilized as a support for the electrophoresis process.

Although almost all immunoelectrophoretic studies to date have been supported on agar gels, cellulose acetate membranes offer several advantages over this medium. These membranes are always ready for use, easily stored, relatively uniform, provide a permanent record and afford greater sensitivity.

There are, however, special problems inherent in the use of cellulose acetate membranes. One problem is that the membranes are too thin to absorb easily the amounts of antiserum required for many reactions. To meet this problem, the use of narrow filter paper strips, laid on the membrane to act as carriers for antiserum was introduced. These strips not only make possible the initial application of antiserum, but also serve as reservoirs during the period of diffusion.

It has been found that the conditions for uniform and complete communication between the saturated filter paper strips and the pores of the membrane are not easily met by purely manual techniques. The usual procedure of trailing a pipette along a strip 60 to 70 mm. long cannot deliver exactly equal amounts of fluid along the whole length of the strip. Reproducible results cannot be achieved. There are also problems of interrupted communication caused by air spaces trapped between the strips and the membrane, problems of strips not fully saturated and therefore dry along the edges or on the other hand so fully saturated as to flood the membrane, and of strips which shift out of their intended straight lines.

These problems have been solved by preparing filter paper strips which can be anchored to the mounting apparatus of the membrane, laying them dry on the membrane after the electrophoretic run, and saturating them evenly by means of a semiautomatic applicator which forms the subject of the present invention. The filter paper strips which may be used in conjunction with this applicator are the subject of copending U.S. application Ser. No. 481,837, filed Aug. 23, 1965 in the name of Z. J. Zec, entitled "Antiserum Strips" and assigned to Beckman Instruments, Inc.

It is therefore an overall object of this invention to provide a semiautomatic apparatus for applying antiserum uniformly and reproducibly along substantially the entire length of the filter paper strips.

It is another object of this invention to provide a semiautomatic apparatus for applying antiserum uniformly and reproducibly along substantially the entire length of the filter paper strips, the dispensing rate of the apparatus being adjustable to accommodate filter paper strips of various widths.

According to one specific, exemplary form or embodiment of the present invention shown and described herein, there is provided a fluid dispensing unit including a syringe-like fluid dispenser, adapted to traverse a deck which is mounted oven an electrophoresis support membrane upon which has been placed one or more filter paper strips. A fluid delivery means in the form of a conduit having a delivery tip is provided for connection with a port in the fluid dispenser. The delivery tip is disposed so as to traverse the upper surface of the paper strips as the dispensing unit is moved along the deck. A cam, mounted on the deck, serves to actuate the dispensing unit as the unit is moved. The position of the cam may be adjusted to provide a variety of fluid volumes.

The novel features which are believed to be characteristic of an invention are set forth with particularity in the appended claims. The invention itself, however, together with further objects and advantages thereof, can best be understood by reference to the following description taken in connection with the accompanying drawings in which:

Figure 1:
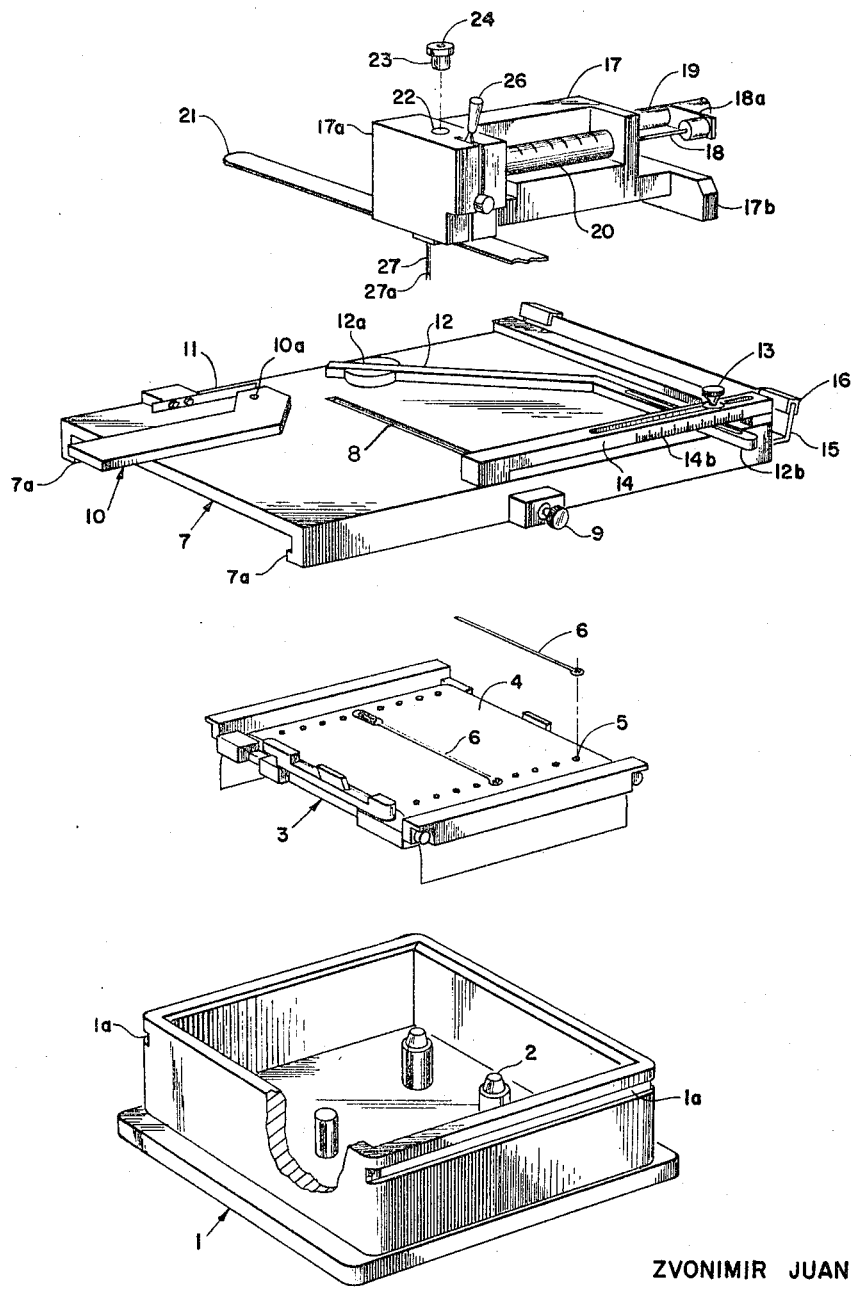
FIGURE 1 is a perspective view of the overall apparatus of the present invention.

Referring now to the drawings, there is shown in FIGURE 1 an exploded, perspective view of the apparatus of the present invention. A chamber 1, having a plurality of internal supports 2, holds a bridge 3 on which a cellulose acetate membrane 4 is mounted. Projecting from the upper surface of the bridge 3 are a number of teeth 5 which serve as anchors for the cellulose acetate membrane and one or more filter paper strips 6 which are laid on top of the membrane. The copending application, referenced above, describes how the filter paper strips 6 may be secured to the teeth 5.

A deck 7, having a transverse through slot 8 fits closely over the chamber 1. Specially-designed edges 7a along opposite sides of the deck 7 project into a pair of recesses 1a formed in opposing, outside walls of the chamber 1. It may be seen that with the bridge 3 in position inside the chamber 1, the deck 7 is slidingly adjustable over the bridge so that the slot 8 may be brought into vertical alignment with any one of the paper strips. When deck 7 is positioned so that the slot 8 comes into alignment with the desired strip, a set screw 9 may be tightened, thereby clamping the deck 7 into a fixed position.

To minimize evaporation from the membrane, a cover 10, pivotally mounted on deck 7 at point 10a, may be swung over the slot 8, when the apparatus is not in use. A cantilevered leaf spring 11, securely affixed to the deck 7, is provided to hold the pivoted cover 10 in either the position as shown in FIG. 1, or in the position in which cover 10 is over the slot 8.

A cam element 12, pivotally mounted on the deck 7 at one of its ends 12a, is provided to actuate the fluid dispensing unit in a manner to be described below. The angle of the cam element 12 with respect to the slot 8 may be adjusted by manipulation of the projecting end 12b of the cam element. A slotted guide member 14, affixed to the upper surface of the deck 7, together with a lock screw 13, provide both a guide means for the pivotal motion of the cam element 12, and clamping means to secure the cam element in the desired position. A scale 14b, calibrated in terms of fluid volume, may be provided on the outside surface of the guide element 14. That is, each scribe mark on the scale 14b designates a specific predetermined volume of fluid which will be discharged during one complete traversal of the dispersing unit along the cam element 12 in a manner to be presently described. In this fashion the quantity of fluid applied to the filter paper strip may be regulated by merely varying the position of cam element 12 along slotted guide member 14. Moreover, the calibrator scales assures that equal volumes of fluid can be applied in subsequent applications.

At one end of the deck 7 is located a groove or track 15 for supporting a dispensing unit base member 17 and guiding its motion. At each end of the track 15 is located an adjustable stop 16 to limit the transverse movement of the base member 17. The dispensing unit base member is provided with a depending projection 17b which is adapted to ride in the track 15.

The fluid dispensing unit, mounted on the base member 17, will now be described. The base member 17 supports a syringe-like dispensing unit 20 which typically may be in the form of a barrel enclosing a plunger 18 projecting from the rear of the barrel. Attached to the rear end of the plunger 18, by means of a bracket 18a is a cam follower 19. The manner in which the cam follower 19 and the cam element 12 cooperate will be described below.

Figure 3:
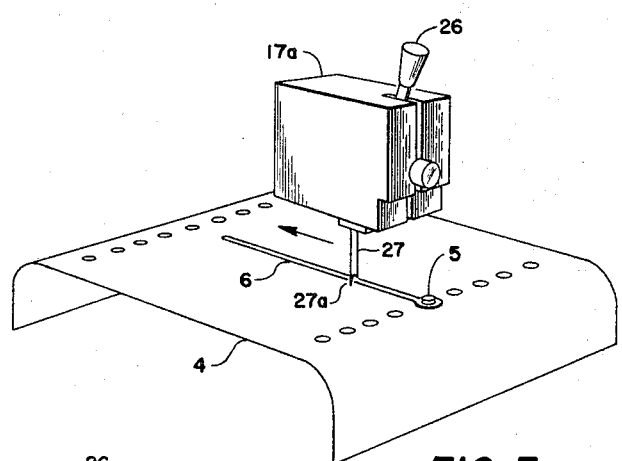
FIGURE 3 is a perspective view of a portion of the apparatus of FIGURE 1.
Figure 4:
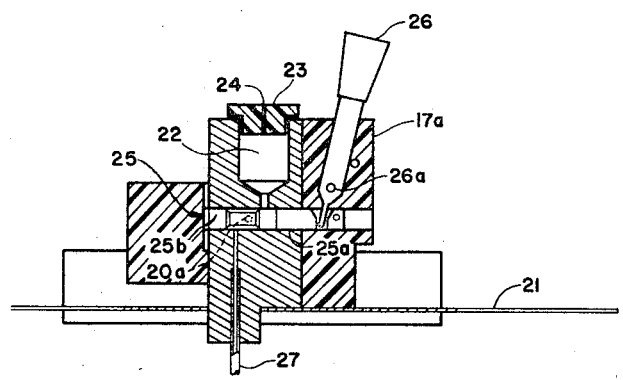
FIGURE 4 is an end view, in section, of a valve utilized with the apparatus of the present invention.

Referring to FIGS. 1 and 4, the dispensing unit base member also supports a block 17a to which is affixed a slot cover 21 and which houses a fluid reservoir 22 having a cap 23 which is provided with a centrally located vent hole 24, a valve 25, a valve actuating lever 26 and a fluid delivery conduit or tube 27 having a delivery tip 27a. It may be seen that with the dispensing unit base member 17 in position such that projection 17b is in the groove 15, the delivery conduit 27 will project down through the slot 8 so that the delivery tip 27a just touches the upper surface of the paper strip. A detail of this is shown in FIGURE 3 in which the deck has been omitted for clarity. It will be seen from FIGURE 3 that the delivery tip 27a is forked so that the tip is capable of straddling narrow paper strips having a free end, such as the one illustrated. The purpose of the forked tip is to insure that the narrow strip will be held straight while the dispensing unit is moved across the deck in addition to serving as the applicator for fluid being applied. On the other hand with wider strips of filter paper the forked or V-shaped delivery tip does not straddle the strip and thus serves only as a fluid applicator.

FIGURE 4 is a view, in section, of the block 17a, which houses the valve 25, the reservoir 22, and the delivery conduit 27. The valve 25 comprises generally a bore 25a which contains a double-ended piston 25b. The movement of the piston 25b is controlled by the lever 26 which is pivotally secured on block 17a by means of a pin 26a. The reservoir 22, a port 20a, located at the forward end of the barrel 20 and the delivery conduit 27 are all in communication with the bore 25a at various points along its length. The valve 25 has two positions. In the position shown in FIG. 4, the port 20a and the delivery conduit 27 are brought into communication and the reservoir is blocked off. Movement of the upper portion of the lever 26 causes the piston 25b to slide towards the right to its other position. In this position, the piston blocks the delivery conduit 27 and the reservoir 22 and the port 20a are brought into communication.

Figure 2:
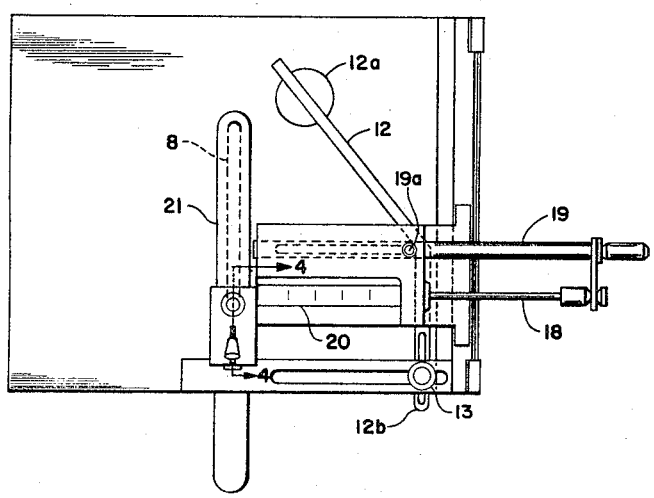
FIGURE 2 is a plan view of the dispensing unit and deck.

Referring to FIGS. 1, 2 and 4, the operation of the apparatus, will now be described. With the base member 17 in the position shown in FIGURE 2 and the valve in the position in which the reservoir is brought into communication with the port 20a, the plunger 18 is pulled back until a pin 19a, rotatably affixed to the cam follower 19, comes in contact with the cam element 12.

As the plunger is pulled back, fluid is drawn from the reservoir 22 into the barrel 20. The valve 25 is now actuated by means of the lever 26 to the position in which the port 20a is brought into communication with the delivery conduit 27. The dispensing unit base member 17 is then drawn across the deck 7. It will be seen that this movement causes the cam element 12 to actuate the cam follower 19 thereby pushing the plunger 18 into the barrel whereby fluid is discharged from the barrel 20, through the delivery conduit 27, to the delivery tip 27a, and from there to the surface of the strip 6. The angular position of the cam element 12 determines the volume of fluid that is dispensed during a single transfer of the dispensing unit across the deck 7. It should be noted that the greater the angle of cam element 12 with respect to the slot 8 the larger the volume of fluid discharged. Conversely, the smaller the angle, that is the closer the cam element 12 is to being parallel with the slot 8, the smaller the volume of liquid discharged during each stroke. This may be easily understood since the closer cam element 12 is to being parallel with slot 8 the shorter the distance of travel from right to left of cam follower 19 and consequently syringe plunger 18 during a single stroke of the dispensing unit. It also should be noted that the cam surface of cam element 12 along which the cam follower 19 travels is straight over its entire length. This means that an equal quantity of fluid is supplied to each unit length of the filter paper strip to ensure a uniform application of the liquid over the entire length of the strip. The flow rate adjustment is necessary to accommodate strips of various widths, the wider strips being, of course, capable of receiving larger quantities of fluid.

It will be obvious to those skilled in the art that various modifications may be made to the specific exemplary embodiment of the invention described. While a particular embodiment has been discussed, it will be understood that the invention is not limited thereto, and that it is contemplated to cover any such modifications as fall within the true spirit and scope of the invention that the appended claims.

What is claimed is:

1. In an electrophoresis apparatus including means for supporting an electrophoresis support membrane wherein the improvement comprises: means for applying a predetermined quantity of fluid uniformly to the surface of said electrophoresis support membrane, comprising:

fluid dispensing and delivering means disposed over said electrophoresis support membrane to deliver the fluid to the surface of said membrane, said fluid dispensing and delivery means being movably mounted so that it may be moved substantially the length of said membrane, and;

means for actuating and controlling the volume of fluid delivered to the membrane as said fluid dispensing and delivery means traverses said membrane whereby a predetermined quantity of fluid is applied uniformly in a substantially narrow channel over the surface of said membrane.

2. Zone electrophoresis apparatus including means for applying fluid to a surface of an absorbent strip of given length placed on an electrophoresis support membrane of said zone electrophoresis apparatus comprising:

a syringe for dispensing a given volume of said fluid said syringe being movably mounted to traverse substantially said length of said strip;

a conduit attached to said syringe for delivering said fluid to said strip; and, a cam, fixed with respect to said syringe and including means for actuating said syringe, said cam being adjustable to regulate the volume of fluid dispensed whereby, as said syringe traverses said strip length, said syringe dispenses a predetermined quantity of said fluid.

3. Zone electrophoresis apparatus including means for applying fluid to a surface of a narrow, absorbent strip of given length, placed on an electrophoresis support membrane of said zone electrophoresis apparatus, said means comprising:

a deck mounted over said electrophoresis support membrane;

a fluid dispensing unit base member movably mounted on said deck;

a fluid dispensing unit having a movable member, said dispensing unit being mounted on said base member, said dispensing unit being capable of holding a quantity of said fluid and having a port;

a delivery conduit connected to said port of said dispensing unit;

a delivery tip connected to said conduit, said delivery tip being disposed over said surface of said strip, said dispensing unit base member being movable so that said delivery tip traverses said surface of said strip substantially the length of said strip;

a cam element mounted on said deck for actuating said dispensing unit and controlling the volume of fluid dispensed and, a cam follower connected to said dispensing unit for driving said movable member of said dispensing unit, said cam follower being driven by said cam element during movement of said dispensing unit base member.

4. An apparatus as defined in claim 3 in which:
said cam element is adjustably positionable to vary the angle between said cam element and said movable member of said dispensing unit to thereby provide various volumes of delivered fluid.

5. An apparatus as defined in claim 4 which includes:
a fluid reservoir mounted on said dispensing unit base; and,
a valve interconnecting said reservoir, said port and said delivery conduit, said valve having a first position to bring said reservoir into communication with said port and a second position to bring said port into communication with said delivery conduit.

6. An apparatus as defined in claim 5 in which:
said delivery tip is forked whereby said tip is capable of straddling said strip.

7. Zone electrophoresis apparatus including means for applying fluid to the upper surface of one or more narrow, absorbent strips of substantially equal length mounted in generally parallel relationship on an electrophoresis support member of said zone electrophoresis apparatus, said means comprising:

a deck having an elongated slot of substantially the same length as said strips, said deck being adjustably mounted over said electrophoresis support membrane so that said deck may be moved to various positions whereby said slot may be brought into vertical alignment with any one of said strips;

an elongated track mounted on said deck, said track extending generally parallel to said slot;

a base member mounted for sliding movement over said deck along said track;

a fluid dispensing unit mounted on said base member, said dispensing unit comprising a barrel, a plunger in said barrel, said plunger extending from one end of said barrel and a port being located at the other end of said barrel;

a fluid reservoir mounted on said base member;

a fluid delivery tube mounted on said base member, said tube having a delivery tip extending below said deck through said slot for delivering fluid to the upper surface of said strip;

a valve mounted on said base member for selectively interconnecting said reservoir and said port in a first position of said valve, and said port and said delivery tube in a second position of said valve;

a cam element, mounted on said deck, being pivotally adjustable to various angles corresponding to various volumes of fluid to be dispensed; and, a cam follower attached to said plunger and biased against said cam element, whereby, as said base member is moved along said track, said delivery tip moves over said upper surface of said strip and said cam element actuates said piston by means of said cam follower, thereby dispensing a predetermined volume of fluid which volume is determined by the angular position of said cam element.

8. An apparatus as defined in claim 4 wherein said cam element includes a linear cam surface along which the cam follower travels so that an equal volume of fluid per unit length of strip is applied.

References Cited
UNITED STATES PATENTS 3,317,418  5/1967  Zec _____ 204—299

ROBERT K. MIHALEK, *Primary Examiner.*

E. ZAGARELLA, *Assistant Examiner.*

U.S. Cl. X.R.

204—180